US012735874B2

(12) United States Patent
Veneshetty et al.

(10) Patent No.: US 12,735,874 B2
(45) Date of Patent: Sep. 15, 2026

(54) MACHINE COMPONENT TRACKING SYSTEM

(71) Applicant: Caterpillar Inc., Peoria, IL (US)

(72) Inventors: Arjun Veneshetty, Dunlap, IL (US); Bhargav Chary Biroju, Morrisville, NC (US); Joseph Andrew Willenborg, Dunlap, IL (US); Jim D. Angell, Naperville, IL (US); Donald Froelich, Gilson, IL (US); Abhishek Awana, Dunlap, IL (US); Sridhar Reddy Chintapally, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 96 days.

(21) Appl. No.: 18/627,856

(22) Filed: Apr. 5, 2024

(65) Prior Publication Data

US 2025/0314049 A1 Oct. 9, 2025

(51) Int. Cl.

| | |
|---|---|
| ***E02F 9/26*** | (2006.01) |
| ***G06F 9/54*** | (2006.01) |
| ***G06Q 10/06*** | (2023.01) |
| ***G06Q 10/20*** | (2023.01) |
| ***G07C 5/00*** | (2006.01) |
| ***H04W 4/80*** | (2018.01) |

(52) U.S. Cl.

CPC .............. *E02F 9/267* (2013.01); *G07C 5/008* (2013.01)

(58) Field of Classification Search

CPC ................................. E02F 9/267; G07C 5/008

USPC ......................................................... 701/32.7

See application file for complete search history.

(56) References Cited

U.S. PATENT DOCUMENTS

| | | | | |
|---|---|---|---|---|
| 7,042,346 | B2 * | 5/2006 | Paulsen | G07C 5/085 701/1 |
| 7,921,000 | B2 | 4/2011 | Ohkura et al. | |
| 2005/0192860 | A1 | 9/2005 | Kouda et al. | |
| 2006/0190153 | A1 | 8/2006 | Kang | |
| 2017/0372534 | A1 * | 12/2017 | Steketee | G06Q 10/087 |
| 2018/0174114 | A1 * | 6/2018 | Neyens | G06Q 10/20 |
| 2021/0222660 | A1 * | 7/2021 | Gil Vera | F02N 11/087 |
| 2022/0081880 | A1 * | 3/2022 | Mupende | E02F 9/267 |

FOREIGN PATENT DOCUMENTS

| | | | |
|---|---|---|---|
| DE | 102012207793 | A1 | 11/2012 |
| JP | 6013974 | B2 | 5/2013 |
| KR | 102436738 | B1 | 10/2020 |

(Continued)

*Primary Examiner* — Tyler D Paige

(57) ABSTRACT

A tracking system may receive a plurality of advertisement messages from a plurality of beacon devices. Each of the plurality of advertisement messages may indicate a respective identifier of a transmitting beacon device of the plurality of beacon devices. A component beacon device, of the plurality of beacon devices, may be attached to a component of the machine, and a remainder of the plurality of beacon devices may be apart from the machine. The tracking system may monitor, in accordance with a plurality of identifiers indicated in the plurality of advertisement messages, respective message counts for the plurality of identifiers. The tracking system may generate a communication that indicates the respective message counts for the plurality of identifiers and productivity data relating to the machine. The tracking system may transmit the communication for a useful life estimation system.

20 Claims, 3 Drawing Sheets

(56) References Cited

FOREIGN PATENT DOCUMENTS

| | | | |
|---|---|---|---|
| KR | 20220137458 | A | 10/2022 |
| WO | 2023040400 | A1 | 3/2023 |
| WO | 2023100129 | A1 | 6/2023 |

* cited by examiner

MACHINE COMPONENT TRACKING SYSTEM

TECHNICAL FIELD

The present disclosure relates generally to work machines and, for example, to a machine component tracking system.

BACKGROUND

Machines with work implements are used in various industries to perform desired operations such as moving, cutting, and breaking up material. The machines and work implements can be configured to permit changing of a work implement being used by a machine. For example, at an end of the work implement's useful life, the work implement can be replaced on the machine with a new work implement. Generally, accurate estimation of a remaining useful life of the work implement involves tracking numerous parameters relating to the work implement and the machine. In some examples, wireless communication between the work implement and the machine can be utilized to track the work implement. However, at a worksite with numerous mobile machines and work implements performing wireless communication, a machine may be unable to differentiate between the wireless signals of multiple different work implements that a machine may encounter, thereby resulting in inaccurate tracking.

U.S. Patent Application Publication No. 20220081880 (the '880 publication) discloses a device for determining the actual state and/or the remaining service life of a construction, materials-handling and/or conveyor machine. The device has a plurality of sensors provided on the construction, materials-handling and/or conveyor machine for recording various state information, a recording unit connected to the sensors for gathering the recorded state information, a central unit able to be connected to the recording unit for evaluating the gathered state information and determining the actual state and/or the remaining service life from the gathered state information, and a display device for displaying the determined actual state and/or the determined remaining service life. The '880 publication does not address differentiating between wireless signals of multiple work implements that a machine may encounter at a worksite.

The tracking system of the present disclosure solves one or more of the problems set forth above and/or other problems in the art.

SUMMARY

A tracking system of a machine may include a first communication controller configured to receive a plurality of advertisement messages from a plurality of beacon devices. Each of the plurality of advertisement messages may indicate a respective identifier of a transmitting beacon device of the plurality of beacon devices. A component beacon device, of the plurality of beacon devices, may be attached to a component of the machine, and a remainder of the plurality of beacon devices may be apart from the machine. The first communication controller may be configured to monitor, in accordance with a plurality of identifiers indicated in the plurality of advertisement messages, respective message counts for the plurality of identifiers. An identifier, of the plurality of identifiers, having a highest message count, of the respective message counts, may be associated with the component beacon device. The first communication controller may be configured to transmit information indicating the respective message counts for the plurality of identifiers. The tracking system may include a second communication controller, communicatively connected to the first communication controller, configured to receive the information indicating the respective message counts for the plurality of identifiers. The second communication controller may be configured to obtain, from one or more additional controllers, productivity data relating to the machine. The second communication controller may be configured to transmit the information and the productivity data to a third communication controller for transmission of the information and the productivity data to a useful life estimation system.

A method may include receiving, by a tracking system of a machine, a plurality of advertisement messages from a plurality of beacon devices. Each of the plurality of advertisement messages may indicate a respective identifier of a transmitting beacon device of the plurality of beacon devices. A component beacon device, of the plurality of beacon devices, may be attached to a component of the machine, and a remainder of the plurality of beacon devices may be apart from the machine. The method may include monitoring, by the tracking system and in accordance with a plurality of identifiers indicated in the plurality of advertisement messages, respective message counts for the plurality of identifiers. An identifier, of the plurality of identifiers, having a highest message count, of the respective message counts, may be associated with the component beacon device. The method may include generating, by the tracking system, a communication that indicates the respective message counts for the plurality of identifiers and productivity data relating to the machine. The method may include transmitting, by the tracking system, the communication for a useful life estimation system.

A machine may include an implement and a tracking system. The tracking system may include a component beacon device attached to the implement. The tracking system may include one or more communication controllers configured to receive a plurality of advertisement messages from a plurality of beacon devices that includes the component beacon device. Each of the plurality of advertisement messages may indicate a respective identifier of a transmitting beacon device of the plurality of beacon devices. The one or more communication controllers may be configured to monitor, in accordance with a plurality of identifiers indicated in the plurality of advertisement messages, respective message counts for the plurality of identifiers. The one or more communication controllers may be configured to obtain productivity data relating to the machine. The one or more communication controllers may be configured to transmit the productivity data and information indicating the respective message counts for the plurality of identifiers for a useful life estimation system to cause estimation of a metric relating to a useful life of the implement.

DETAILED DESCRIPTION

This disclosure relates to a tracking system, which is applicable to any machine that utilizes a wearable component (e.g., a component that is worn down over time), such as a work implement.

Figure 1:
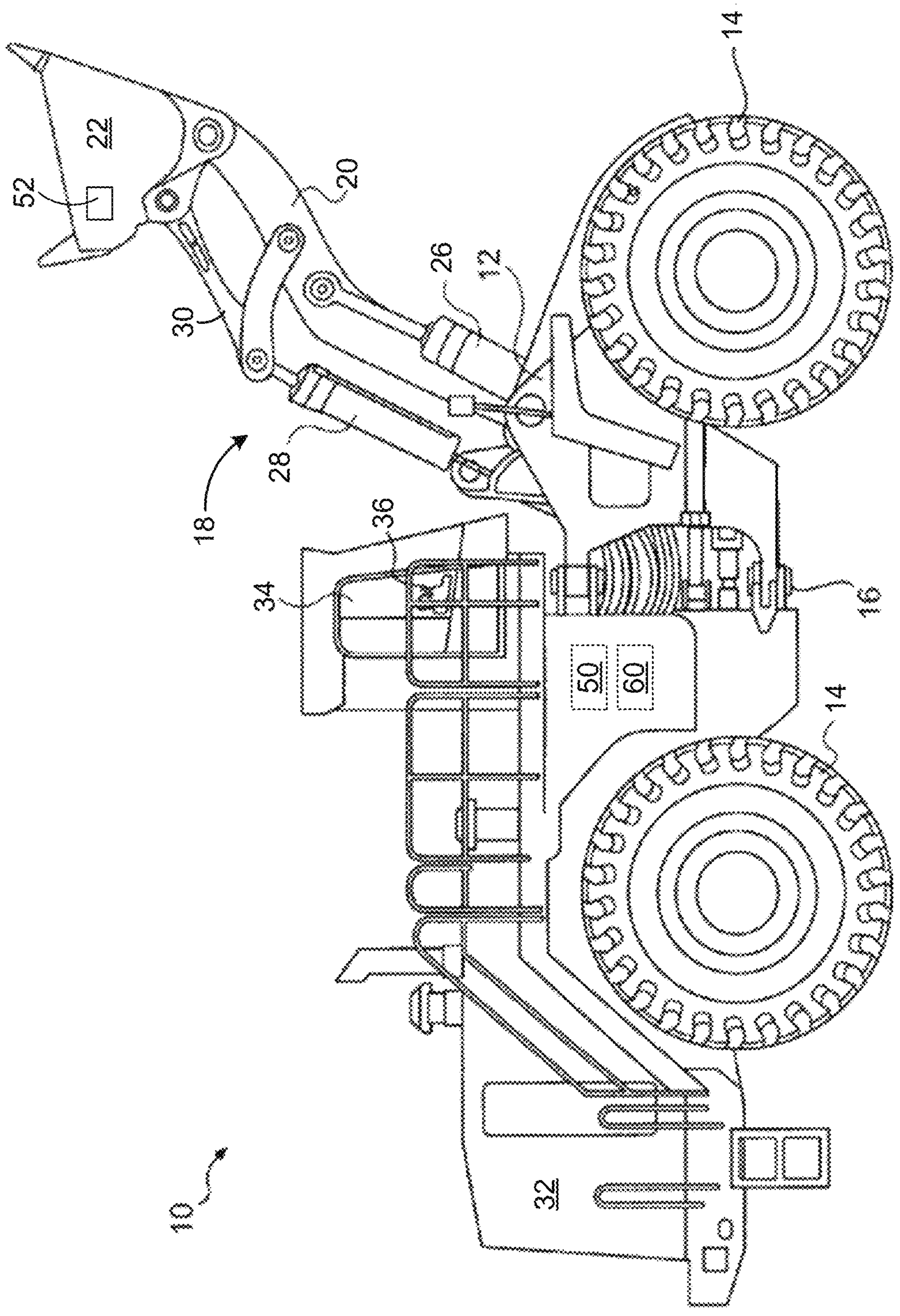
FIG. 1 is a side view of an example machine.

FIG. 1 is a side view of an example machine 10. The machine 10 may perform earth moving, excavation, or another operation associated with an industry such as construction or mining, among other examples. For example, as illustrated in FIG. 1, the machine 10 is a wheel loader. However, the machine 10 may be another type of machine, such as a compactor machine, a paving machine, a cold planer, a grading machine, a backhoe loader, a harvester, an excavator, a motor grader, a skid steer loader, a tractor, a dozer, or the like.

The machine 10 includes a frame 12 that is supported by one or more traction devices 14 used to propel the machine 10 in a forward direction and/or a rearward direction. The traction devices 14 are configured to engage a ground surface, such as a road or another type of terrain. The traction devices 14 may include wheels, as shown, and/or tracks, among other examples. The frame 12 may include a front section and a rear section connected by an articulation joint 16 that allows the front section of the frame 12 to pivot about the articulation joint 16 relative to the rear section of the frame 12, thereby steering the machine 10. Additionally, or alternatively, the machine 10 may include another type of steering system, such as a rack and pinion mechanism or independent gear drives or motors associated with individual traction devices 14, among other examples.

The machine 10 includes a linkage assembly 18 movably coupled to the frame 12. The linkage assembly 18 includes a lift arm 20 movably coupled to the frame 12, and an implement 22 movably coupled to the lift arm 20. The implement 22 may be a bucket, as shown, or another type of implement capable of performing work operations such as loading, stock piling, dumping, or the like. For example, the implement 22 may be a blade, a broom, a bale spear, a compaction drum, or the like, among other examples. The linkage assembly 18 also includes one or more actuators (e.g., hydraulic actuators) configured to provide movement of the linkage assembly 18. As shown, the linkage assembly 18 may include one or more lift actuators 26, connected to the frame 12 and the lift arm 20, that are configured to raise and lower the lift arm 20 relative to the frame 12. Furthermore, the linkage assembly 18 may include one or more tilt actuators 28 configured to tilt the implement 22. For example, the linkage assembly 18 may include a tilt linkage 30 that is pivotably connected to the tilt actuator(s) 28, the lift arm 20, and the implement 22 to enable tilting of the implement 22.

The frame 12 supports a power source 32. The power source 32 may be an engine, such as a diesel engine, a gasoline engine, or a gaseous fuel engine (e.g., a natural gas engine), among other examples. Additionally, or alternatively, the power source 32 may be a fuel cell or an energy storage device (e.g., a battery), among other examples. Here, the power source 32 may be coupled to one or more electric motors (not shown) of the machine 10. The power source 32 is configured to produce a mechanical and/or an electrical power output used to drive the traction devices 14, a steering system of the machine 10, and/or the linkage assembly 18.

The frame 12 may support an operator station 34. The operator station 34 includes one or more controls 36, such as joysticks, pedals, levers, buttons, switches, knobs, touch screen controls, operator consoles, and/or a steering wheel, among other examples. The controls 36 enable an operator to control the machine 10 during operation. In some implementations, the machine 10 may be configured for remote controlled operation (e.g., a remote control for the machine 10 may include the joystick and/or the button) or autonomous operation.

The machine 10 includes a tracking system 50. The tracking system 50 includes a component beacon device 52 and one or more communication controllers (e.g., electronic control modules (ECMs)), as described in connection with FIG. 2. The component beacon device 52 is attached to a wearable component of the machine 10, such as the implement 22, the power source 32 (e.g., an engine), a chassis of the machine 10, or the like. The component beacon device 52 is associated with a unique identifier (e.g., a medium access control (MAC) address). The identifier of the component beacon device 52 may be mapped (e.g., via a mobile application or the like) to a component identifier (e.g., a serial number) associated with the wearable component.

The machine 10 may also include a monitoring system 60. The monitoring system 60 may include one or more controllers (e.g., ECMs) configured to monitor and/or report machine productivity parameters, such as machine hours, machine operation cycles, machine fuel consumption, and/or machine payload weight, among other examples.

As indicated above, FIG. 1 is provided as an example. Other examples may differ from what is described with regard to FIG. 1.

Figure 2:
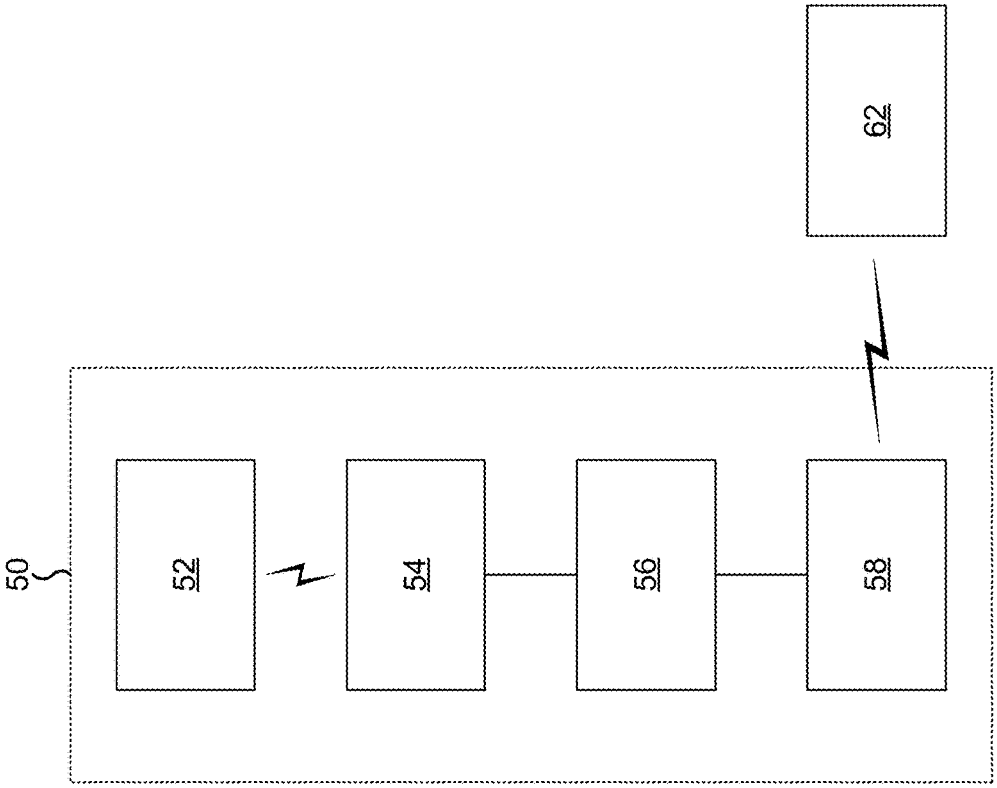
FIG. 2 is a diagram of an example of a tracking system.

FIG. 2 is a diagram of an example of the tracking system 50. As shown, the tracking system 50 may include the component beacon device 52, a first communication controller 54 (e.g., an ECM), a second communication controller 56 (e.g., an ECM), and a third communication controller 58 (e.g., an ECM). Moreover, the tracking system 50 may communicate with a useful life estimation system 62 (e.g., a back-office system, a cloud-based system, or the like). For example, the useful life estimation system 62 may include one or more computing devices (e.g., one or more servers) located remotely from the machine 10.

The component beacon device 52 includes a short-range wireless transmitter (e.g., a Bluetooth transmitter). The component beacon device 52 is configured to periodically transmit advertisement messages. The first communication controller 54 may include a short-range wireless receiver (e.g., transceiver). For example, the short-range wireless receiver may include a Bluetooth receiver. The second communication controller 56 may include a networking device, such as a router. The third communication controller 58 may include a long-range wireless transmitter (e.g., transceiver). For example, the long-range wireless transmitter may include a radio configured to communicate on a WiFi link, a cellular link, a satellite link, or the like.

As shown, the second communication controller 56 is communicatively connected to the first communication controller 54 and communicatively connected to the third communication controller 58. For example, the second communication controller 56 may have a wired connection to the first communication controller 54 (e.g., via a communication bus, such as a controller area network (CAN) bus) and a wired connection to the third communication controller 58 (e.g., via an Ethernet connection). In some implementations, the first communication controller 54 may be configured to communicatively connect to an electronic technician system to enable activation, deactivation, and/or updating of software for the first communication controller 54.

In some implementations, the first communication controller 54, the second communication controller 56, and/or the third communication controller 58 may be combined into a single device, or a single device may perform operations described herein as being performed by the first communication controller 54, the second communication controller 56, and/or the third communication controller 58. Additionally, or alternatively, one or more operations described herein as being performed by one of the first communication controller 54, the second communication controller 56, or the third communication controller 58 may be performed by a different one of the first communication controller 54, the second communication controller 56, or the third communication controller 58.

The first communication controller 54 may be configured to scan (e.g., while the machine 10 is powered on) for advertisement messages (e.g., wireless signals) transmitted by beacon devices. Accordingly, the first communication controller 54 may receive (e.g., using the short-range wireless receiver) a plurality of advertisement messages from a plurality of beacon devices that are in range of the first communication controller 54 at various times as the machine 10 is operating at a work site. For example, the beacon devices may include the component beacon device 52 attached to the wearable component (e.g., implement 22) of the machine 10, and a remainder of the beacon devices may be apart from the machine 10 (e.g., they may be attached to components of other machines that are near the machine 10, or attached to disconnected components that are near the machine 10). The beacon devices may transmit the advertisement messages, and the first communication controller 54 may receive the advertisement messages, using a wireless personal area network (WPAN) technology (e.g., Bluetooth or Bluetooth Low Energy) or another short-range wireless communication technology. For example, advertisement messages transmitted by the beacon devices may have a maximum detectable range of 100 meters.

Each of the advertisement messages may indicate a respective identifier of a transmitting beacon device. For example, a first advertisement message may indicate a first identifier associated with a first beacon device, a second advertisement message may indicate a second identifier associated with a second beacon device, and so forth. In some implementations, each of the advertisement messages may further indicate a respective battery voltage of a battery of a transmitting beacon device, a quantity of operational hours of the transmitting beacon device, and/or a type (e.g., a model number) of the transmitting beacon device (e.g., where different types of beacon devices are used for different wearable components).

Because the wearable component (e.g., implement 22) of the machine 10 sometimes may be changed, there is a possibility that any of the advertisement messages received by the first communication controller 54 (e.g., from the plurality of beacon devices) could be an advertisement message of the component beacon device 52 that is attached to the wearable component. Accordingly, the tracking system 50 may be unable to identify which advertisement messages originate from the component beacon device 52 based solely on a content of the advertisement messages. However, over time, the first communication controller 54 should receive the most advertisement messages from the component beacon device 52 because the component beacon device 52 is continuously in range of the first communication controller 54, whereas other beacon devices only sporadically come within range of the first communication controller 54.

As the first communication controller 54 receives advertisement messages, the first communication controller 54 may monitor respective message counts for the identifiers indicated in the advertisement messages. For example, in connection with the monitoring, the first communication controller 54 may record, in a log, entries indicating the respective message counts for the identifiers. As an example, the first time the first communication controller 54 receives an advertisement message indicating a particular identifier, the first communication controller 54 may record an entry in the log indicating the identifier and indicating a counter for the identifier set to an initial value (e.g., a value of "1"). Continuing with the example, each subsequent time the first communication controller 54 receives an advertisement message indicating the particular identifier, the first communication controller 54 may increment the counter for the identifier in the entry. Thus, an identifier having a highest message count may indicate that the identifier is associated with the component beacon device 52 (e.g., the identifier has a highest probability of being associated with the component beacon device 52). In some implementations, the entries in the log may also indicate reported battery voltages, operational hours, and/or beacon device types associated with each identifier (e.g., the most-recently reported battery voltage and/or operational hours for an identifier may be recorded in the log). Additionally, the log may indicate a total quantity of identifiers that were detected by the first communication controller 54.

In some implementations, the first communication controller 54 may maintain the log at a threshold quantity of entries (e.g., 20 entries) in order to minimize the size of the log, thereby reducing computing resources needed to store the log and reducing network resources needed to communicate the log. For example, the first communication controller 54 may drop, from the log, one or more entries indicating the lowest message counts, among the entries in the log, to maintain the threshold quantity of entries in the log. In particular, an identifier associated with the lowest message count has a low probability of being the identifier associated with the component beacon device 52.

The first communication controller 54 may transmit, and the second communication controller 56 may receive, the log (e.g., information indicating the respective message counts for the identifiers). The first communication controller 54 may transmit, and the second communication controller 56 may receive, logs at regular intervals (e.g., every 24 hours) or irregular intervals (e.g., in response to detecting an occurrence of a particular event).

In some implementations, the first communication controller 54 and/or the second communication controller 56 may detect a key off event (e.g., a powering off) for the machine 10. For example, the first communication controller 54 and/or the second communication controller 56 may receive, from another controller of the machine 10, an indication indicating the key off event. The first communication controller 54 may transmit, and the second communication controller 56 may receive, the log (e.g., information indicating the respective message counts for the identifiers) responsive to the key off event.

For example, responsive to detecting the key off event, the first communication controller 54 may transmit the log to the second communication controller 56. Alternatively, responsive to detecting the key off event, the second communication controller 56 may transmit a request for the log to the first communication controller 54, and the first communication controller 54 may respond with the log. After transmitting the log to the second communication controller 56, the first communication controller 54 may delete the log.

The second communication controller 56 may obtain productivity data relating to the machine 10. The productivity data may indicate a lifetime (e.g., a total or aggregate) quantity of machine hours (e.g., service meter hours) of the machine 10, a lifetime (e.g., a total or aggregate) machine operation cycle count (e.g., a quantity of dig cycles) of the machine 10, a lifetime (e.g., a total or aggregate) fuel consumption of the machine 10, and/or a lifetime (e.g., a total or aggregate) payload weight of the machine 10, among other examples. The second communication controller 56 may obtain the productivity data from one or more controllers of the machine 10 (e.g., controllers of the monitoring system 60). The second communication controller 56 may obtain productivity data at regular intervals (e.g., every 120 seconds) or irregular intervals (e.g., in response to detecting the key off event, or another event).

The second communication controller 56 may generate a communication that includes the log (e.g., indicating the respective message counts for the identifiers) and the productivity data. For example, the second communication controller 56 may combine the log (e.g., for one or more reporting periods), received from the first communication controller 54, and the productivity data, received from one or more additional controllers (e.g., of the monitoring system 60), into the communication. In some implementations, the communication may indicate a timestamp for the productivity data to enable time-based comparisons of the productivity data to previous productivity data. Moreover, the communication may indicate an identifier (e.g., a serial number) associated with the machine 10.

The second communication controller 56 may transmit the communication (e.g., that includes the log and the productivity data) for the useful life estimation system 62. For example, the second communication controller 56 may transmit the communication to the third communication controller 58 for transmission of the communication to the useful life estimation system 62. As an example, the third communication controller 58 may forward (e.g., using the long-range wireless transmitter) the communication to the useful life estimation system 62. Such communications may be transmitted to the useful life estimation system 62 at regular intervals (e.g., once per day). If a transmission at a regular interval is missed due to connectivity issues, then the transmission may be performed once connectivity between the third communication controller 58 and the useful life estimation system 62 is re-established.

Transmission of the log (e.g., information indicating the respective message counts) and the productivity data to the useful life estimation system 62 may cause the useful life estimation system 62 to perform an estimation of a metric relating to a useful life of the implement 22 (e.g., a remaining useful life metric, a total useful life metric, or the like) in accordance with the log and the productivity data. For example, the useful life estimation system 62 may use the log to identify a beacon device (e.g., the component beacon device 52) that was connected to the machine for a current reporting period. Moreover, the useful life estimation system 62 may use a mapping of beacon device identifiers to component serial numbers to identify a component associated with that beacon device.

As one example, the useful life estimation system 62 may determine that an identifier associated with a highest message count that is at least a threshold percentage (e.g., 50%) more than a message count of the next-highest identifier is associated with a primary component/beacon device that was connected to the machine 10 for a current reporting period. As another example, the useful life estimation system 62 may determine that an identifier associated with a highest message count that satisfies a threshold value is associated with a primary component/beacon device that was connected to the machine 10 for a current reporting period. If no identifier in the log satisfies a condition for being associated with the primary component/beacon device, then the useful life estimation system 62 may determine that none of the components/beacon devices associated with the logged identifiers were connected to the machine 10 during a current reporting period. As a further example, if a first log for the machine 10 indicates a first identifier associated with a highest message count (e.g., satisfying the threshold percentage or the threshold value), and a second log for the machine 10 indicates a second identifier associated with a highest message count (e.g., satisfying the threshold percentage or the threshold value), then the useful life estimation system 62 may determine that a component/beacon device associated with the first identifier has been disconnected from the machine 10 and has been replaced with a component/beacon device associated with the second identifier during a current reporting period.

In some implementations, the logs from multiple machines may indicate the same identifier as having the highest message counts (e.g., the same implement was connected to multiple machines during a reporting period). Here, the useful life estimation system 62 may associate the identifier to the machine whose log indicated the highest message count among the multiple logs.

The useful life estimation system 62 may estimate the metric in accordance with the primary component/beacon device that is identified as being connected to the machine 10, productivity data relating to the machine 10 over a particular time range, productivity data associated with the primary component over the particular time range (e.g., if the primary component was connected to multiple different machines over the time range), and/or log data associated with the primary component over the particular time range (e.g., which may indicate an amount of time in the current reporting period that the primary component was connected to the machine 10). In some implementations, the useful life estimation system 62 may estimate the metric using a machine learning model, or the like. In some implementations, the useful life estimation system 62 may transmit a notification (e.g., for the machine 10, for a user device, or the like) that identifies a wearable component (e.g., using a serial number of the wearable component) and indicates the useful life metric associated with the wearable component.

As indicated above, FIG. 2 is provided as an example. Other examples may differ from what is described with regard to FIG. 2.

Figure 3:
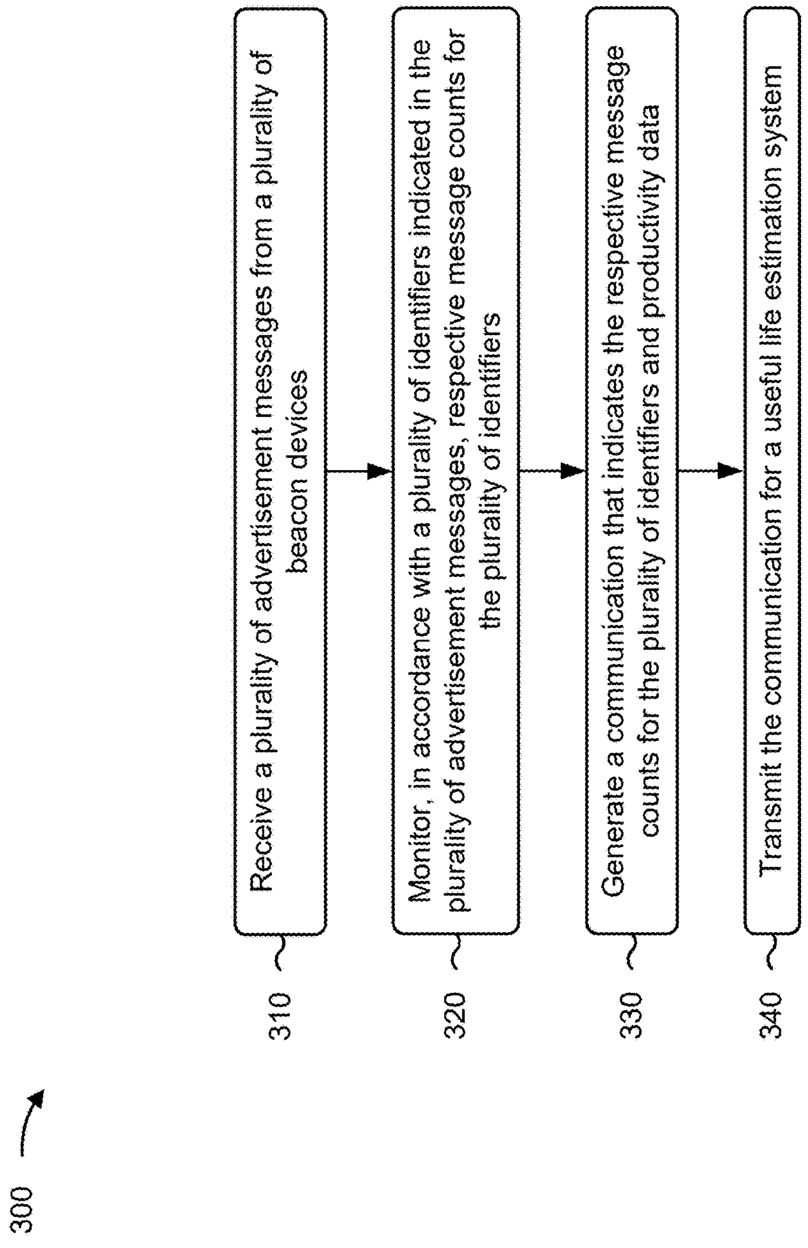
FIG. 3 is a flowchart of an example process associated with tracking a machine component.

FIG. 3 is a flowchart of an example process 300 associated with tracking a machine component. One or more process blocks of FIG. 3 may be performed by a tracking system (e.g., tracking system 50). Additionally, or alternatively, one or more process blocks of FIG. 3 may be performed by another device or a group of devices separate from or including the tracking system, such as another device or component that is internal or external to machine 10.

As shown in FIG. 3, process 300 may include receiving a plurality of advertisement messages from a plurality of beacon devices (block 310). For example, the tracking system (e.g., using the first communication controller 54 and/or a wireless receiver thereof) may receive a plurality of advertisement messages from a plurality of beacon devices, as described above. Each of the plurality of advertisement messages may indicate a respective identifier of a transmitting beacon device of the plurality of beacon devices. Additionally, each of the plurality of advertisement messages may further indicate a respective battery voltage of the transmitting beacon device. A component beacon device, of the plurality of beacon devices, may be attached to a component of a machine, and a remainder of the plurality of beacon devices may be apart from the machine. The component of the machine may be an implement.

As further shown in FIG. 3, process 300 may include monitoring, in accordance with a plurality of identifiers indicated in the plurality of advertisement messages, respective message counts for the plurality of identifiers (block 320). For example, the tracking system (e.g., using the first communication controller 54, a memory thereof, and/or a processor thereof) may monitor respective message counts for the plurality of identifiers, as described above. An identifier, of the plurality of identifiers, having a highest message count, of the respective message counts, may be associated with the component beacon device. Monitoring the respective message counts may include recording, in a log, entries indicating the respective message counts for the plurality of identifiers. Monitoring the respective message counts may further include dropping, from the log, one or more entries that indicate lowest message counts, of the respective message counts, to maintain a threshold quantity of the entries in the log.

Process 300 may include transmitting (e.g., by the first communication controller 54 to the second communication controller 56) information indicating the respective message counts for the plurality of identifiers. Process 300 may include detecting a key off event for the machine, and the information may be transmitted (e.g., by the first communication controller 54 to the second communication controller 56) responsive to the key off event.

As further shown in FIG. 3, process 300 may include generating a communication that indicates the respective message counts for the plurality of identifiers and productivity data (block 330). For example, the tracking system (e.g., using the second communication controller 56, a memory thereof, and/or a processor thereof) may generate a communication that indicates the respective message counts for the plurality of identifiers and productivity data, as described above. Process 300 may include transmitting (e.g., by the second communication controller 56 to the third communication controller 58) the information and the productivity data.

As further shown in FIG. 3, process 300 may include transmitting the communication for a useful life estimation system (block 340). For example, the tracking system (e.g., using the third communication controller 58 and/or a wireless transmitter thereof) may transmit the communication for a useful life estimation system, as described above.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

INDUSTRIAL APPLICABILITY

The tracking system described herein may be used with any machine that includes a wearable component (e.g., a work implement). For example, the tracking system may be used with a machine that is configured to permit changing of a work implement being used by the machine. As an example, at an end of the work implement's useful life, the work implement can be replaced on the machine with a new work implement. Generally, accurate estimation of a remaining useful life of the work implement involves tracking numerous parameters relating to the work implement and the machine. In some examples, wireless communication between the work implement and the machine can be utilized to track the work implement. However, at a worksite with numerous mobile machines and work implements performing wireless communication, differentiating between the wireless signals of multiple work implements that a machine may encounter is difficult, thereby resulting in inaccurate tracking. Inaccurate tracking of the remaining useful life of the work implement can lead to excessive machine downtime and/or damage to the machine.

The tracking system described herein is useful for tracking a wearable component of a machine using wireless communication. In particular, the tracking system may differentiate wireless signals of beacon devices attached to multiple components to accurately identify a beacon device attached to the component that is connected to the machine. In this way, the tracking system improves the accuracy and relevancy of tracking data, thereby conserving computing resources that would otherwise be used to process inaccurate and irrelevant tracking data. Furthermore, by improving the accuracy and relevancy of tracking data, the tracking system facilitates improved useful life estimation for the wearable component. Accordingly, the improved useful life estimation may reduce machine downtime and/or damage to the machine.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

When "a controller" or "one or more controllers" is described or claimed (within a single claim or across multiple claims) as performing multiple operations or being configured to perform multiple operations, this language is intended to broadly cover a variety of controller architectures and environments. For example, unless explicitly claimed otherwise (e.g., via the use of "first controller" and "second controller" or other language that differentiates controllers in the claims), this language is intended to cover a single controller performing or being configured to perform all of the operations, a group of controllers collectively performing or being configured to perform all of the operations, a first controller performing or being configured to perform a first operation and a second controller performing or being configured to perform a second operation, or any combination of controllers performing or being configured to perform the operations. For example, when a claim has the form "one or more controllers configured to: perform X; perform Y; and perform Z," that claim should be interpreted to mean "one or more controllers configured to perform X; one or more (possibly different) controllers configured to perform Y; and one or more (also possibly different) controllers configured to perform Z."

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A tracking system of a machine, comprising:

a first communication controller configured to:

receive a plurality of messages from a plurality of beacon devices, wherein each of the plurality of messages indicates:

a respective identifier of a transmitting beacon device of the plurality of beacon devices, and respective status information of the transmitting beacon device, and wherein a component beacon device, of the plurality of beacon devices, is attached to a component of the machine, and a remainder of the plurality of beacon devices are apart from the machine;

monitor, in accordance with a plurality of identifiers indicated in the plurality of messages, respective message counts for the plurality of identifiers;

record, in a log, entries that associate each identifier of the plurality of identifiers with a respective message count representing a quantity of the plurality of messages indicating the identifier; and transmit information indicating the respective message counts for the plurality of identifiers and the respective identifier associated with the respective message counts;

a second communication controller, communicatively connected to the first communication controller, configured to:

receive the information indicating the respective message counts for the plurality of identifiers and the respective identifier associated with the respective message counts;

obtain, from one or more additional controllers, productivity data indicating one or more of: a lifetime quantity of machine hours, a lifetime machine operation cycle count, a lifetime fuel consumption, or a lifetime payload weight; and transmit the information and the productivity data to a third communication controller for transmission of the information and the productivity data to a useful life estimation system to cause the useful life estimation system to:

determine that an identifier, of the plurality of identifiers, having a highest message count, of the respective message counts, is associated with the component beacon device, associate, based on determining that the identifier having the highest message count is associated with the component beacon device, a portion of the productivity data to the component, perform an estimation of a metric relating to a useful life of the component in accordance with the portion of the productivity data and the information indicating the respective message counts, generate information indicating a remaining useful life of the component based on the estimation, and provide the information to a user device for display of the remaining useful life of the component.

2. The tracking system of claim 1, wherein the respective status information of the transmitting beacon device includes a respective battery voltage of the transmitting beacon device.

3. The tracking system of claim 1, wherein the first communication controller or the second communication controller is further configured to detect a key off event for the machine, and wherein the first communication controller is configured to transmit the information, or the second communication controller is configured to receive the information, responsive to the key off event.

4. The tracking system of claim 1, wherein the first communication controller, to monitor the respective message counts for the plurality of identifiers, is further configured to:

drop, from the log, one or more entries that indicate lowest message counts, of the respective message counts, to maintain a threshold quantity of the entries in the log.

5. The tracking system of claim 1, wherein the useful life estimation system is configured to identify the component using a serial number of the component.

6. The tracking system of claim 1, wherein the productivity data is obtained for a particular time range corresponding to are recorded for a particular period of time corresponding to an amount of time that the component was connected to the machine.

7. A method, comprising:

receiving, by a tracking system of a machine, a plurality of messages from a plurality of beacon devices, wherein each of the plurality of messages indicates:

a respective identifier of a transmitting beacon device of the plurality of beacon devices, and respective status information of the transmitting beacon device, and wherein a component beacon device, of the plurality of beacon devices, is attached to a component of the machine, and a remainder of the plurality of beacon devices are apart from the machine;

monitoring, by the tracking system and in accordance with a plurality of identifiers indicated in the plurality of messages, respective message counts for the plurality of identifiers;

recording, in a log, entries that associate each identifier of the plurality of identifiers with a respective message count representing a quantity of the plurality of messages indicating the identifier;

generating, by the tracking system, a communication that indicates the respective message counts for the plurality of identifiers and productivity data relating to the machine, wherein the productivity data indicates one or more of: a lifetime quantity of machine hours, a lifetime machine operation cycle count, a lifetime fuel consumption, or a lifetime payload weight; and transmitting, by the tracking system, the communication for a useful life estimation system to cause the useful life estimation system to:

determine that an identifier, of the plurality of identifiers, having a highest message count, of the respective message counts, is associated with the component beacon device, associate, based on determining that the identifier having the highest message count is associated with the component beacon device, a portion of the productivity data to the component, perform an estimation of a metric relating to a useful life of the component in accordance with the portion of the productivity data and the information indicating the respective message counts, generate information indicating a remaining useful life of the component based on the estimation, and provide the information to a user device for display of the remaining useful life of the component.

8. The method of claim 7, wherein the component of the machine is an implement.

9. The method of claim 7, wherein the respective status information of the transmitting beacon device includes a respective battery voltage of the transmitting beacon device.

10. The method of claim 7, wherein the tracking system includes a first communication controller that includes a short-range wireless receiver, a second communication controller, and a third communication controller that includes a long-range wireless transmitter, wherein the second communication controller has a wired connection to the first communication controller and the third communication controller.

11. The method of claim 10, wherein receiving the plurality of messages and monitoring the respective message counts for the plurality of identifiers uses the first communication controller, wherein generating the communication uses the second communication controller, and wherein transmitting the communication uses the third communication controller.

12. The method of claim 11, wherein generating the communication comprises:

transmitting, by the first communication controller to the second communication controller, information indicating the respective message counts for the plurality of identifiers; and transmitting, by the second communication controller to the third communication controller, the information and the productivity data.

13. The method of claim 12, further comprising:

detecting a key off event for the machine, wherein the information is transmitted by the first communication controller to the second communication controller responsive to the key off event.

14. The method of claim 7, wherein the useful life estimation system is configured to identify the component using a serial number of the component.

15. A machine, comprising:

an implement; and a tracking system, comprising:

a component beacon device attached to the implement; and one or more communication controllers configured to:

receive a plurality of messages from a plurality of beacon devices that includes the component beacon device, wherein each of the plurality of messages indicates:

a respective identifier of a transmitting beacon device of the plurality of beacon devices, and respective status information of the transmitting beacon device;

monitor, in accordance with a plurality of identifiers indicated in the plurality of messages, respective message counts for the plurality of identifiers;

record, in a log, entries that associate each identifier of the plurality of identifiers with a respective message count representing a quantity of the plurality of messages indicating the identifier;

obtain productivity data relating to the machine, wherein the productivity data indicates one or more of: a lifetime quantity of machine hours, a lifetime machine operation cycle count, a lifetime fuel consumption, or a lifetime payload weight; and transmit the productivity data and information indicating the respective message counts and the respective identifier associated with the respective message counts for the plurality of identifiers for a useful life estimation system to cause the useful life estimation system to:

determine an identifier, of the plurality of identifiers, having a highest message count, of the respective message counts is associated with the component beacon device, associate, based on determining the identifier having the highest message count is associated with the component beacon device, a portion of the productivity data to the implement, perform an estimation of a metric relating to a useful life of the implement in accordance with the portion of the productivity data and the information indicating the respective message counts, generate information indicating a remaining useful life of the implement based on the estimation, and provide the information to a user device for display of the remaining useful life of the implement.

16. The machine of claim 15, wherein the implement is a bucket.

17. The machine of claim 15, wherein the one or more communication controllers include a first communication controller that includes a short-range wireless receiver, a second communication controller, and a third communication controller that includes a long-range wireless transmitter, wherein the second communication controller has a wired connection to the first communication controller and the third communication controller.

18. The machine of claim 17, wherein the first communication controller is configured to receive the plurality of messages and to monitor the respective message counts, wherein the second communication controller is configured to obtain the productivity data, and wherein the third communication controller is configured to transmit the productivity data and the information for the useful life estimation system.

19. The machine of claim 15, wherein the plurality of messages use a wireless personal area network technology.

20. The machine of claim 15, wherein the useful life estimation system is configured to identify the implement using a serial number of the implement.

* * * * *